United States Patent [19]
Burke et al.

[11] Patent Number: 5,879,825
[45] Date of Patent: Mar. 9, 1999

[54] GYPSUM WALLBOARD AND METHOD OF MAKING SAME

[75] Inventors: W. Roy Burke, Tonawanda; Larry W. Kingston, North Tonawanda, both of N.Y.

[73] Assignee: National Gypsum Company, Charlotte, N.C.

[21] Appl. No.: 779,938

[22] Filed: Jan. 7, 1997

[51] Int. Cl.$^6$ ................................................. B32B 13/00
[52] U.S. Cl. ........................... 428/703; 106/778; 106/802
[58] Field of Search ............................ 428/703; 106/778, 106/802

[56] References Cited

U.S. PATENT DOCUMENTS

| | | | |
|---|---|---|---|
| 3,869,415 | 3/1975 | Williams | 260/17 R |
| 3,895,018 | 7/1975 | Adolf | 260/29.7 S |
| 4,002,713 | 1/1977 | Duncan et al. | 264/234 |
| 4,042,409 | 8/1977 | Terada et al. | 106/111 |
| 4,051,291 | 9/1977 | Long | 428/201 |
| 4,057,662 | 11/1977 | Johnson et al. | 427/209 |
| 4,265,964 | 5/1981 | Burkhart | 428/306 |
| 4,752,538 | 6/1988 | Bounini | 428/703 |
| 4,988,390 | 1/1991 | Kambayashi et al. | 106/774 |
| 5,026,576 | 6/1991 | Benvenuto et al. | 427/355 |
| 5,075,358 | 12/1991 | Riley et al. | 524/5 |
| 5,250,153 | 10/1993 | Izard et al. | 162/152 |
| 5,558,710 | 9/1996 | Baig | 106/780 |
| 5,631,312 | 5/1997 | Takada et al. | 524/5 |

FOREIGN PATENT DOCUMENTS

| | | |
|---|---|---|
| 2125733 | 9/1972 | France . |
| 2404952 | 8/1974 | Germany . |
| 2649300 | 5/1978 | Germany . |
| 2927785 | 2/1981 | Germany . |
| 196 20 387 A1 | 5/1996 | Germany . |
| 60-127256 | 7/1985 | Japan . |
| 05 078 154 | 3/1993 | Japan . |
| 577186 | 11/1977 | U.S.S.R. . |
| 1111711 | 5/1968 | United Kingdom . |

OTHER PUBLICATIONS

PCT Written Opinion re: International Application No. PCT/US97/23625, International Preliminary Examining Authority, dated Oct. 1, 1998.
Material Safety Data Sheet, Rohm and Haas Company, "Generic Aqueous Acrylic Emulsion Type I," pp. 1–7, dated Jul. 23, 1994.
Material Safety Data Sheet, Rohm and Haas Company, "Generic Aqueous Acrylic Emulsion Type II," pp. 1–8, dated May 21, 1993.
Kirk–Othmer Encyclopedia of Chemical Technology, vol. 21, Second Edition, 1970, pp. 621–624.
Kirk–Othmer Encyclopedia of Chemical Technology, vol. 4, Fourth Edition, pp. 812–826.
Hawley's Condensed Chemical Dictionary, Eleventh Edition, Van Nostrand Reinhold Company, New York, p. 564, definition of "glass transition temperature".
Definiton of "Minimum Film–Forming Temperature Bar".
PCT International Search Report, International Searching Authority, dated Apr. 24, 1998.
Chemical Abstracts, vol. 114, No. 8, dated Feb. 25, 1991, Columbus, Ohio, Abstract No. 68057b, Lightweight Gypsum Boards.

Primary Examiner—Elizabeth Evans
Attorney, Agent, or Firm—Marshall, O'Toole, Gerstein, Murray & Borun

[57] ABSTRACT

A method of preparation and use of high-strength gypsum wallboard, as well as a core composition suitable for use therein, are disclosed. The core composition includes a slurry of calcium sulfate hemihydrate (stucco), water, and a strengthening agent. The strengthening agent includes an acrylic polymer composition having a glass transition temperature of about 15° C. or greater, and preferably has good divalent ion stability. The method provides wallboard having increased core strength, paper-to-core bonding, and strength-to-weight ratio.

34 Claims, No Drawings

GYPSUM WALLBOARD AND METHOD OF MAKING SAME

BACKGROUND OF THE INVENTION

1. Field of the Invention

The present invention relates generally to the production of gypsum board materials, and is more particularly directed to the production and use of high strength gypsum wallboard.

2. Description of Related Technology

One of the most common manners today of constructing walls and barriers includes the use of inorganic wallboard panels or sheets, such as gypsum wallboard, often referred to simply as "wallboard" or "drywall." Wallboard can be formulated for interior, exterior, and wet applications. The use of wallboard, as opposed to conventional wet plaster methods, is often desirable because the installation of wallboard is ordinarily less costly than installation of conventional plaster walls.

Generally, wallboard is conventionally produced by enclosing a core of an aqueous slurry of calcined gypsum and other materials between two large sheets of board cover paper. Various types of cover paper are known in the art. After the gypsum slurry has set (i.e., reacted with the water from the aqueous slurry) and dried, the sheet is cut into standard sizes. Methods for the production of gypsum wallboard are described, for example, in the Kirk-Othmer Encyclopedia of Chemical Technology, Second Edition, 1970, Vol. 21, pages 621–24, the disclosure of which is hereby incorporated herein by reference.

Walls and ceilings made with gypsum wallboard panels are conventionally constructed by securing, e.g. with nails or screws, the wallboard panels to structural members, for example vertically and horizontally oriented pieces of steel or wood such as "studs." Because wallboard is typically supplied in standard-sized sheets or panels, when forming a wall from the sheets, there will generally be a number of joints between adjacent sheets. In most wallboard construction, these joints are filled and coated with an adhesive material called a joint compound so that the wall will have a smooth finish similar to that obtained with conventional wet plaster methods.

Gypsum wallboard is typically manufactured commercially by processes that are capable of operation under continuous high speed conditions. The aqueous slurry of calcined gypsum and other ingredients are continuously deposited to form a core between two continuously-supplied moving sheets of cover paper. The calcined gypsum forming the core between the two cover sheets is then allowed to set. The continuously-produced board is cut into panels of a desired length (for example, eight feet) and then passed through a drying kiln in which excess water is removed and the gypsum is brought to a final dry state. After the core has set and is dried, the sandwich becomes a strong, rigid, fire-resistant building material.

A major ingredient of the gypsum wallboard core is calcium sulfate hemihydrate, commonly referred to as "stucco" or "Plaster of Paris." Stucco is commonly manufactured by drying, grinding, and calcining natural gypsum rock. The drying step of stucco manufacture includes passing crude gypsum rock through a rotary kiln to remove any free moisture accumulated in the rock from rain or snow, for example. The dried rock is then passed through a roller mill (a type of pulverizer), wherein the rock is ground to a desired fineness. The dried, ground gypsum can be referred to as "land plaster."

The calcination step is performed by heating the ground gypsum rock, and is described by the following chemical equation:

This chemical equation shows that calcium sulfate dihydrate plus heat yields calcium sulfate hemihydrate (stucco) plus water vapor. This process is conducted in a "calciner," of which there are several types known in the art.

Uncalcined calcium sulfate (the land plaster) is the "stable" form of gypsum. However, calcined gypsum, or stucco, has the valuable property of being chemically reactive with water, and will "set" rather quickly when the two are mixed together. This setting reaction is actually a reversal of the above-described chemical reaction performed during the calcination step. The reaction proceeds according to the following equation:

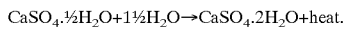

In this reaction, the calcium sulfate hemihydrate is rehydrated to its dihydrate state over a fairly short period of time. The actual time required for this setting reaction is generally dependent upon the type of calciner employed and the type of gypsum rock that is used, and can be controlled within certain limits by the use of additives such as accelerators and retarders.

Because high-weight gypsum wallboard per se is generally not necessary or desirable, various attempts have been made to reduce board weight and density without sacrificing board strength. Heavy gypsum wallboards are more costly and difficult to manufacture than lighter boards. Moreover, in comparison to light boards, heavy boards are more costly and difficult to transport, store, and manually install at job sites.

In order to provide satisfactory strength, commercially-available gypsum wallboard generally requires a density of approximately 1700 pounds (approximately 772 kilograms) per thousand square feet of one-half inch board. It is possible to formulate wallboard having reduced densities through the inclusion of lightweight fillers and foams, for example. Typically, however, where wallboard is formulated to have a density reduced from 1700 pounds per thousand square feet of one-half inch board, the resulting strength is unacceptable for commercial sale.

It would therefore be advantageous to produce high-strength gypsum wallboard having weights and densities reduced from those produced by known methods. Reduced weight and density boards should meet industry standards and have strengths similar to, or greater than, heavier wallboard. Such wallboard also should be able to be manufactured through the use of conventional high-speed manufacturing apparatus and not suffer from other negative side-effects. For example, such high-strength wallboard should be able to set and dry within a reasonable period of time.

SUMMARY OF THE INVENTION

It is an object of the invention to overcome one or more of the problems described above.

Accordingly, the invention provides methods for producing a gypsum composition suitable for use in construction materials that includes combining calcium sulfate hemihydrate, water, and a strength-enhancing agent. The strength-enhancing agent includes an acrylic polymer emulsion. The acrylic polymer emulsion should have a glass transition temperature ($T_g$) of about 15° C. or greater, and preferably in the range of about 15° C. to about 60° C., more preferably in the range of about 20° C. to about 60° C., and most preferably in the range of about 35° C. to about 60° C. The acrylic polymer emulsion is preferably substantially stable to divalent cations.

According to one feature of the invention, calcium sulfate hemihydrate, water, and a strength-enhancing agent are combined to produce a core composition in the form of a slurry. As described above, the strength-enhancing agent is an acrylic polymer emulsion having a glass transition temperature of about 15° C. or greater, as described below in detail. Conventional wallboard core ingredients can also be included. The core composition is deposited between two paper cover sheets and allowed to set to produce a wallboard product.

The invention allows for the production of a wallboard product having a substantially reduced weight, while still providing beneficial strength characteristics.

Other objects and advantages of the invention will be apparent to those skilled in the art from the following detailed description, taken in conjunction with the appended claims.

DETAILED DESCRIPTION OF PREFERRED EMBODIMENTS

According to the invention, there are provided core compositions including a strengthening agent in the form of an acrylic polymer emulsion suitable for use in the production of panels of gypsum wallboard. The invention further provides a method of preparation and use of gypsum wallboard having a high strength to weight ratio through the use of the aforementioned core composition.

A preferred method process for manufacturing the core composition and wallboard of the invention initially includes the premixing of dry ingredients in a mixing apparatus. The dry ingredients can include calcium sulfate hemihydrate (stucco), an accelerator, and an antidesiccant (e.g., starch), as described below in greater detail.

The dry ingredients are mixed together with a "wet" (aqueous) portion of the core composition in a pin mixer apparatus. The wet portion can include a first component (referred to as a "paper pulp solution") that includes a mixture of water, paper pulp, and, optionally, fluidity-increasing agents. A set retarder can be included. The paper pulp solution provides a major portion of the water that forms the gypsum slurry of the core composition. A second wet component preferably includes a mixture of the aforementioned strengthening agent, foam, and other conventional additives, if desired.

The produced core composition slurry is deposited between paper cover sheets to form a sandwich. The core composition is allowed to cure or set, whereby calcium sulfate hemihydrate is converted to calcium sulfate dihydrate. The product is then preferably dried to remove any excess water not consumed in the reaction forming the calcium sulfate dihydrate. (Excess water has preferably been included to decrease the viscosity of the slurry during production.)

The setting reaction produces gypsum crystals, which are interwoven to contribute strength to the wallboard core. The crystal-to-crystal interaction is important to the final strength of the gypsum wallboard product. The method of the invention is able to produce wallboard having crystal-to-crystal interactions that are increased over those in presently-available wallboard.

The gypsum crystals also preferably interlock with paper fibers protruding from the surface or cover papers, thus bonding the papers to the core. This bonding or interaction also increases the strength of the wallboard product. The compositions of the invention also preferably are able to produce wallboards having increased paper-to-core bonding.

The method of the invention allows a substantial reduction in board weight and density, while producing wallboard that can meet industry strength standards. By way of example only, the methods of the invention can allow for the production of high strength wallboard weighing about 1480 pounds per thousand square feet (based on one-half inch thick board), and even lower in some cases.

The preferred ingredients of the wallboard core composition of the invention will now be described in more detail. The first ingredient of the wallboard core composition of the invention is calcium sulfate hemihydrate, or stucco ($CaSO_4 \cdot \frac{1}{2} H_2O$). Calcium sulfate hemihydrate can be produced by the methods described above. Calcium sulfate is described in the Kirk-Othmer Encyclopedia of Chemical Technology, Fourth Edition, Vol. 4, pages 812–26, the disclosure of which is hereby incorporated herein by reference.

As is known by those of skill in the art, there are two types of calcium sulfate hemihydrate, the $\alpha$-hemihydrate form and the $\beta$-hemihydrate form. These two forms are typically produced by different types of calcination processes and differ structurally to some extent. Either type of calcium sulfate hemihydrate is suitable for use with the invention.

Other dry ingredients are preferably included in the core composition, including an accelerator which can be used to control, within certain limits, the crystal growth rate and set time of the stucco. Examples of suitable accelerators include ball mill accelerators ("BMA") and potassium sulfate, although many others are known to those of skill in the art. In some cases, the invention may require increased amounts of accelerator due to the retarding effect of some of the strenth-enhancing additives.

An antidessicant such as starch is also included in order to prevent the dehydration of calcium sulfate dihydrate crystals formed during setting of the core composition. In some products, lightweight aggregates (e.g., expanded perlite or vermiculite) can be included.

An aqueous slurry or solution of paper pulp is also included in the core composition. The pulp solution comprises water and paper fibers ("paper pulp"), and may also include a retarder, corn starch, and/or potash. The retarder is used in conjunction with the aforementioned accelerator in order to tailor the set time of the core composition. Retarding agents are typically used in with the invention at very low rates (if at all), for example at about 0.0007 weight percent, based on the weight of the core composition.

The paper pulp solution can also include one or more of a number of additives that increase the fluidity of the slurry and/or reduce the water requirements of slurry. Materials used as fluidity-enhancing and/or water-reducing agents include "lignosulfonates" which are available commercially either in liquid or powder form. Agents supplied in liquid form can be either incorporated in the pulp solution or added directly to the mixing operation.

The pulp solution can be prepared by blending or mixing the above ingredients with water in a blending apparatus. Alternatively, a concentrated pulp solution using only a small volume of water can be produced. In this case, the remainder of the core mix water requirement is made up with a separate water source. An excess of water with respect to the above-described rehydration reaction is preferably included in order to provide satisfactory flowability of the core composition. Typically, about 75 weight parts water are used per 100 weight parts stucco. Preferably, high shear mixing "pulps" the material, forming a homogenous solution or slurry. The pulp solution can be transferred to a holding vessel, from which it can be continuously added to the core composition mix. The paper fibers in the pulp solution serve to enhance the flexibility of the gypsum wallboard. Gypsum wallboard made without fibers is typically very brittle and more susceptible to breakage during handling. The paper fibers also aid in evenness of drying during manufacture, as well as enhance the ability of the final wallboard product to accept and hold nails during installation.

As indicated above, the wet portion of the core composition also preferably includes a component that incorporates both a foam and a strength-enhancing agent.

Foam introduces air voids into the core through the use of a foam that contains very little solid material, but is resilient enough to resist substantial breakdown in the mixing operation. In this manner, the density of the core can be controlled. Known foaming agents may be supplied in either liquid or flake (powdered) form, and may be produced from soaps known in the art.

The strength-enhancing agent of the invention preferably includes, and may consist essentially of, an acrylic polymer emulsion having certain preferred properties, as described below. When added to the gypsum wallboard core composition, the acrylic polymer emulsion can provide significantly increased core strength, paper-to-core bond, and other physical properties. Consequently, the board density can be reduced while still maintaining required board physical properties.

Although the invention is not limited by any particular mechanism and the mechanisms that achieve the benefits of the invention are not presently clearly understood, it is believed that the acrylic polymer deposits itself in the contact areas between crystals of calcium sulfate dihydrate and also between the crystals and paper fibers at the core-paper interface. The polymer strengthens the bond between the two elements in contact and "welds" them together to provide a strength greater than that which can be achieved without the acrylic polymer.

One important factor in selecting the acrylic polymer emulsion is the glass transition temperature, or "$T_g$", of the acrylic polymer emulsion. The glass transition temperature is the temperature at which an amorphous material changes from a brittle vitreous state to a plastic state. Many polymers such as acrylics and their derivatives have this transition point, which may, at least in some cases, be related to the number of carbon atoms in their ester groups.

The polymer emulsion should have a glass transition temperature ($T_g$) of about 15° C. or greater, and preferably in the range of about 15° C. to about 60° C., more preferably in the range of about 20° C. to about 60° C., and most preferably in the range of about 35° C. to about 60° C.

It has been found that polymer emulsions having $T_g$ values substantially below about 15° C. undesirably provide a core that forms a moisture vapor transmission barrier at the plane of evaporation. The plane of evaporation is the location at or below the core surface where the water drawn thereto evaporates during the drying process. A moisture transmission barrier is formed if the polymer forms a film that inhibits the water within the gypsum wallboard from evaporating in a reasonable period of time. Such a film would make it substantially more difficult to dry gypsum wallboard, causing increased energy and cost requirements for the drying process. Therefore, it is not desirable to form a film in the wallboard core. The invention therefore allows use of commercial manufacturing apparatus and facilities.

Certain acrylic polymer emulsions are more stable than others in the aqueous calcium sulfate environment encountered during the gypsum wallboard production process. Since the divalent calcium ions in the aqueous slurry can adversely affect the performance of some polymer emulsions, the polymer emulsion should be formulated to be stable to calcium ions.

By way of example only, the acrylic polymer may have a molecular weight in the range of about 300,000 to about 700,000, although this range is believed to be variable. Acrylic polymers having other molecular weights are useful with the invention. The acrylic polymer can be crosslinked or noncrosslinked.

The polymers used with the invention are preferably neutralized with sodium hydroxide (NaOH) or other non-volatile neutralizing agent, and more preferably neutralized with an agent consisting essentially of a nonvolatile neutralizing agent. Ammonium hydroxide is preferably not included in any substantial amount in the neutralizing agent for the acrylic polymer, since substantial amounts may adversely affect the product. Most preferably, the neutralizing agent is substantially free of ammonium salts or other source of ammonia.

Various acrylic polymer emulsions suitable for use with the invention are commercially available. For example, suitable polymer emulsions are available from Rohm & Haas Co. of Philadelphia, Pa. under the trade name Rhoplex (e.g., Rhoplex 55-521, Rhoplex E-2409, and Rhoplex B-1162). Other polymer emulsions in the Rhoplex line have been designated by Rohm & Haas as RG 2718, RG 2719, RG 2721, and KAK 1868. Other suitable polymer emulsions are available from Dow Chemical Co. of Midland, Mich.

The polymer emulsions can include about 20 to about 80 weight percent of an acrylic polymer, about 20 to about 80 weight percent water, about 0.3 weight percent or less aqua ammonia, and less than about 0.1 weight percent residual monomers. The emulsions can have a pH in a range of about 2.1 to about 11.0, and a specific gravity in a range of about 1.0 to about 1.2.

The strength-enhancing agent of the invention is preferably included at a rate in a range of about 0.25 to about 2.5 percent solids, more preferably about 0.5 to about 2.0 percent solids, and most preferably about 0.5 to about 1.0 percent solids, based on the weight of the rehydrated gypsum in the final product.

Gypsum wallboard can be adapted for wet and exterior applications, in addition to use in constructing interior walls and ceilings. In the production of exterior sheathing and moisture-resistant board cores, various materials can be incorporated into the core to impart increased water absorption resistance to the board. Useful materials include silicone water repellents, waxes, and asphalt emulsions. These materials are typically supplied as water emulsions to facilitate ease of incorporation into the board core. These materials can be added directly into the mixing apparatus or incorporated into the pulp solution prior to addition to the mixing apparatus.

General ranges of ingredients used in the wallboard (excluding the strength-enhancing agent) are shown in Table I below, along with two sample formulae.

TABLE I

| Ingredient | Exemplary Range | Sample Formula | Sample Formula |
|---|---|---|---|
| stucco (CaSO$_4$.½H$_2$O) | 48–55 wt. % | 870 g | 696 g |
| accelerator | 0.04–0.25 wt. % | 1.0 g | 1.8 g |
| starch | 0.12–0.32 wt. % | 4.0 g | 4.0 g |
| retarder | 0–0.2 wt. % | 0 g | 0 g |
| paper pulp | 0.06–0.18 wt. % | 2.00 g | 1.6 g |
| pulp water | 36–44 wt. % | 670 g | 524 g |
| foam solution (soap and water) | 4–12 wt. % | 156.3 g | 136.7 g |

In order to demonstrate the advantageous results of the invention, comparative testing has been performed. One manner in which to measure the strength of a wallboard product is a nail pull test performed in accordance with ASTM C473 "Physical Testing of Gypsum Board Products," the disclosure of which is hereby incorporated herein by reference. This test requires a minimum-pull force value of 80 pounds or pounds (force) in order to produce a satisfactory (e.g., "passing") product, as provided by "ASTM C36 Standard Specification for Gypsum Wallboard."

Generally, various gypsum wallboard control samples were made using either no polymer emulsion or polymer emulsions having a $T_g$ outside the range of the present invention (e.g., "Control 2" and "Control 4" in Table II below). Gypsum wallboards were made in accordance with the invention using polymer emulsions having $T_g$ values of about 15° C. or greater (e.g., "Invention C, A, F and D" in Table II).

Table II summarizes the reduced board weights that can be achieved by the invention, in comparison to weights obtainable with the control boards, as shown through testing with 1 weight percent polymer based upon the weight of rehydrated gypsum. The provided board weights or densities are given per 1000 square feet of one-half inch thick board. (For the sake of clarity, control or comparative polymer emulsions and boards are referred to by a number designation, while those of the invention are referred to by a letter designation as listed in Table III.)

TABLE II

SUMMARY

| Polymer Emulsion | $T_g$ | Approximate Lowest Board Weights to Attain 80 lb. feet Nail Pull (half inch board) |
|---|---|---|
| Controls lacking polymer treatment | (no polymer used) | 1700 lbs./1000 square feet |
| Control 2 (N-1031) | −31° C. | 1700 lbs./1000 square feet |
| Control 4 (FM-2727) | −8° C. | 1700 lbs./1000 square feet |
| Invention C (E-2409) | 15° C. | 1590 lbs./1000 square feet |
| Invention A (B-1162) | 15° C. | 1576 lbs./1000 square feet |
| Invention H (2719-3) | 35° C. | 1495 lbs./1000 square feet |
| Invention D (2718-1) | 60° C. | 1480 lbs./1000 square feet |

As indicated above, the control boards were able to achieve satisfactory nail pull results (80 pounds of force) with minimum board weights of 1700 lbs./1000 square feet of half inch board. In contrast, boards made in accordance with the present invention were able to achieve 80 pounds of force for the nail pull test with minimum board weights of 1660 lbs./1000 square feet ("Invention C") down to as low as 1480 lbs./1000 square feet ("Invention D"). Thus, it can be seen that the invention can provide wallboards having strength-to-weight ratios increased over wallboards using either no polymer additive or polymers outside the scope of the invention.

The comparative testing is described below in greater detail. Table III below describes the properties of several of the preferred polymer emulsions of the invention that were used in testing of the invention, along with their tradenames. The test procedure will then be described.

TABLE III

| Polymer Emulsion | Trade Name | $T_g$ | Divalent Ion Stability | Cross-linked? | % Solids of Emulsion by Weight | pH |
|---|---|---|---|---|---|---|
| A | Rhoplex B-1162 | 15 | not directly known | yes | 38.0 | 7.7 |
| B | Rhoplex SS-521 | 45 | not directly known | no | 50.0 | 9.5 |
| C | Rhoplex E-2409 | 15 | not directly known | yes | 38.0 | 7.7 |
| D | RG 2718-1 | 60 | good | no | 47.6 | 9.2 |
| E | RG 2718-2 | 60 | excellent | no | 48.3 | 9.1 |
| F | RG 2719-1 | 35 | minimal | no | 47.9 | 8.4 |
| G | RG 2719-2 | 35 | good | no | 48.3 | 8.5 |
| H | RG 2719-3 | 35 | excellent | no | 48.9 | 8.4 |
| I | RG 2721-1 | 35 | good | yes | 50.2 | 8.7 |
| J | RG 2721-2 | 35 | good | yes | 49.4 | 9.1 |

EXPERIMENT I (RC-6994)

In Experiment I, wallboards including polymer emulsion A, B, or C, described in Table III, were compared to control boards utilizing either no polymer treatment or a polymer treatment falling outside the scope of the present invention.

All of the tested boards were made using core formulations according to the general formula of Table I (similar to commercial recipes), and included stucco, starch, pulp, water, and foam. The formulations could include an accelerator and a retarder. The polymers were added either with the pulp water or with the foam solution. The produced core compositions were cast into paper "envelopes" representing commercial paper covering sheets to form sample "boards." After the boards were cast, they were dried in an oven programmed to simulate a commercial 3 zone board drying kiln until almost dry. Drying is finished in a 109° F. oven. This drying step assures that the drying process has not caused surface calcination that might affect testing.

The produced boards were then tested for various strength properties. Nail pull values were determined in accordance with the ASTM test described above. The nail pull values resulted from an average of the highest six of ten individual nail pulls. In addition, the core strength was tested to obtain a compression value ("Core P.S.I.") for each board. The results provided below are averages of four compression tests performed with a universal test machine, known to those of skill in the art.

Additionally, two tests were performed to measure "90° Pull Force" values for each board. The 90° pull force test measures relative strength of the paper, paper-to-core bond, and core strength at or near the paper-core interface. In a first pull force test ("P.F. @ 70/50"), each board is initially allowed to stand in a 70° F. (21.1° C.) and 50% relative humidity environment for twenty-four hours. The paper surface of the board is scored using a utility knife into a 1 inch wide strip, 4 inches long in the strong direction of the paper to the paper edge. A second cut is scored in the end core 1/16 inch below the paper-core interface to a depth of 1/4 inch. This creates a 1/4 inch by 1 inch tab in the end of the board that is bent up for attachment to the pulling instrument.

One edge of the tab remains attached to the board. A clamp is secured to the face paper tab. An instrument is used to pull up on the tab at a 90° angle to the board (i.e., directly upwardly or vertically) until the tab fails. The force applied at at the failure point is then recorded in ounces. A "Percent Bond" (or "% Bond") value is visually determined for each 90° pull force test, and is an estimate of the amount of bond remaining after each test.

A second pull force test ("P.F. @ 90/90") is performed in the same manner, except that each board is initially allowed to stand in a 90° F. (32.2° C.) and 90° relative humidity environment for two hours prior to the performance of the test.

The pull force and percent bond results are averages of eight individual tests, two in each of two perpendicular directions for both the front and back of the board.

Each polymer was tested in a separate "run" of tests with its own control board. As indicated below, the data have been normalized to assist in making comparisons among the different board runs (since the control board for each run did not produce exactly the same data). For each run and each test, the control is assigned a normalized figure of 100, and the data for each tested board is adjusted accordingly. For all of these tests, a higher value indicates a stronger product.

The table below describes each board, the included polymer treatment (if any), the amount and rate at which the polymer treatment is included, and the test results.

TABLE IV

| Board | $T_g$ | Board Wt. | Dosage | % Solids | Normalized Nail Pull | Core P.S.I. | P.F. @ 70/50 | % Bond @ 70/50 | P.F. @ 90/90 | % Bond @ 90/90 |
|---|---|---|---|---|---|---|---|---|---|---|
| Control 1 | no polymer | 1684 | 0 | 0 | 100 | 100 | 100 | 100 | 100 | 100 |
| Control 2a | −31° C. | 1688 | 9.3 g | 0.5 | 90 | 93 | 95 | 97 | 77 | 90 |
| Control 2b | −31° C. | 1681 | 9.3 g | 0.5 | 95 | 95 | 103 | 100 | 84 | 99 |
| Control 2c | −31° C. | 1674 | 9.3 g | 0.5 | 93 | 95 | 99 | 99 | 89 | 101 |
| Control 3 | no polymer | 1699 | 0 | 0 | 100 | 100 | 100 | 100 | 100 | 100 |
| Control 4a | −8° C. | 1687 | 10.1 g | 0.5 | 96 | 101 | 107 | 101 | 105 | 102 |
| Control 4b | −8° C. | 1664 | 10.1 g | 0.5 | 96 | 92 | 95 | 97 | 94 | 95 |
| Control 4c | −8° C. | 1703 | 20.2 g | 1.0 | 104 | 101 | 103 | 101 | 99 | 103 |
| Control 4d | −8° C. | 1657 | 20.2 g | 1.0 | 97 | 97 | 102 | 101 | 98 | 102 |
| Control 5 | no polymer | 1688 | 0 | 0 | 100 | 100 | 100 | 100 | 100 | 100 |
| Invention A1 | 15° C. | 1690 | 13.3 g | 0.5 | 105 | 115 | 107 | 104 | 102 | 104 |
| Invention A2 | 15° C. | 1685 | 13.3 g | 0.5 | 106 | 109 | 106 | 104 | 102 | 103 |
| Invention A3 | 15° C. | 1661 | 13.3 g | 0.5 | 98 | 101 | 110 | 104 | 102 | 104 |
| Control 6 | no polymer | 1703 | 0 | 0 | 100 | 100 | 100 | 100 | 100 | 100 |
| Invention A4 | 15° C. | 1718 | 26.6 g | 1.0 | 120 | 112 | 97 | 100 | 97 | 102 |
| Invention A5 | 15° C. | 1705 | 26.6 g | 1.0 | 119 | 112 | 105 | 101 | 97 | 101 |
| Invention A6 | 15° C. | 1673 | 26.6 g | 1.0 | 114 | 110 | 105 | 101 | 100 | 102 |
| Invention A7 | 15° C. | 1664 | 26.6 g | 1.0 | 107 | 106 | 102 | 101 | 95 | 102 |
| Invention A8 | 15° C. | 1620 | 26.6 g | 1.0 | 105 | 115 | 105 | 101 | 105 | 102 |
| Invention A9 | 15° C. | 1576 | 26.6 g | 1.0 | 100 | 95 | 101 | 101 | 106 | 101 |
| Invention A10 | 15° C. | 1547 | 26.6 g | 1.0 | 93 | 61 | 106 | 101 | 104 | 103 |
| Control 7 | no polymer | 1703 | 0 | 0 | 100 | 100 | 100 | 100 | 100 | 100 |
| Invention B1 | 45° C. | 1707 | 10.1 g | 0.5 | 108 | 118 | 97 | 101 | 99 | 102 |
| Invention B2 | 45° C. | 1697 | 20.2 g | 1.0 | 108 | 117 | 100 | 101 | 101 | 103 |
| Invention B3 | 45° C. | 1673 | 30.3 g | 1.5 | 108 | 126 | 97 | 101 | 99 | 103 |
| Control 8 | no polymer | 1681 | 0 | 0 | 100 | 100 | 100 | 100 | 100 | 100 |
| Invention B4 | 45° C. | 1668 | 30.3 g | 1.5 | 116 | 103 | 107 | 104 | 100 | 103 |
| Invention B5 | 45° C. | 1652 | 30.3 g | 1.5 | 123 | 117 | 111 | 104 | 108 | 103 |
| Invention B6 | 45° C. | 1641 | 30.3 g | 1.5 | 116 | 130 | 110 | 104 | 103 | 103 |
| Invention B7 | 45° C. | 1638 | 30.3 g | 1.5 | 114 | 120 | 113 | 104 | 105 | 98 |
| Invention B8 | 45° C. | 1603 | 30.3 g | 1.5 | 107 | 111 | 118 | 103 | 101 | 102 |
| Invention B9 | 45° C. | 1555 | 30.3 g | 1.5 | 100 | 91 | 112 | 103 | 97 | 103 |
| Control 9 | no polymer | 1716 | 0 | 0 | 100 | 100 | 100 | 100 | 100 | 100 |
| Invention C1 | 15° C. | 1692 | 13.3 g | 0.5 | 103 | 136 | 97 | 101 | 95 | 102 |
| Invention C2 | 15° C. | 1636 | 13.3 g | 0.5 | 94 | 122 | 97 | 101 | 95 | 102 |
| Invention C3 | 15° C. | 1698 | 26.6 g | 1.0 | 110 | 137 | 93 | 101 | 97 | 103 |
| Control 10 | no polymer | 1703 | 0 | 0 | 100 | 100 | 100 | 100 | 100 | 100 |
| Invention C4 | 15° C. | 1653 | 26.6 g | 1.0 | 99 | 113 | 101 | 103 | 99 | 101 |
| Invention C5 | 15° C. | 1630 | 26.6 g | 1.0 | 106 | 109 | 99 | 104 | 99 | 101 |
| Invention C6 | 15° C. | 1625 | 26.6 g | 1.0 | 108 | 109 | 104 | 104 | 100 | 102 |
| Invention C7 | 15° C. | 1617 | 26.6 g | 1.0 | 105 | 108 | 102 | 102 | 101 | 100 |
| Invention C8 | 15° C. | 1591 | 26.6 g | 1.0 | 101 | 100 | 98 | 101 | 98 | 100 |
| Invention C9 | 15° C. | 1566 | 26.6 g | 1.0 | 92 | 97 | 96 | 101 | 92 | 90 |
| Invention C10 | 15° C. | 1539 | 26.6 g | 1.0 | 91 | 92 | 93 | 99 | 89 | 79 |

It can be seen from the data in Table IV that the boards utilizing the treatment of the invention typically outperformed the control boards (i.e., control boards including either no polymer treatment or a polymer treatment having a $T_g$ of −8° C. or less).

An analysis of the raw (i.e., non-normalized) data (not shown) shows that the control boards required a board weight of approximately 1700 pounds per 1000 square feet (for one-half inch board) in order to achieve satisfactory nail pull test results (i.e., 80 pounds of force, as described above). In contrast, boards made in accordance with the invention including polymer emulsion A at a level of about 1% solids (based on core weight) was able to reduce the board weight to 1575 pounds per 1000 square feet. Polymer emulsion B, included at a level of about 1.5% solids, was able to reduce the board weight to 1550 pounds per 1000 square feet. Polymer emulsion C, included at a level of about 1% solids, was able to reduce the board weight to 1590 pounds per 1000 square feet. These conclusions are summarized in Table V below.

TABLE V

EXPERIMENT I CONCLUSIONS

| Polymer Emulsion Included | Board Weight | Approx. Percent Reduction | Approx. Wt. Reduct. |
|---|---|---|---|
| None (Control) | Approx. 1700 | — | — |
| A | 1575 | 6.5% | 125 lbs. |
| B | 1550 | 8.8% | 150 lbs. |
| C | 1500 | 11.8% | 200 lbs. |

EXPERIMENT II

In a second experiment, ten control boards were made without any polymer treatment, as shown in Table VI. These control boards were compared with several boards made in accordance with the invention with seven different polymer emulsions at the indicated rates based upon weight of rehydrated gypsum. The utilized polymer emulsion treatments are described in Table III above.

As in Experiment I, the produced boards were then evaluated for nail pull, core compression strength, 90° pull force and bond percent at 70° F./50% relative humidity, and 90° pull force and bond percent at 90° F./90% relative humidity. These tests were performed according to the methods described above. The results are provided in Table VI through Table XIII below, wherein the board weight is per 1000 square feet of one-half inch board. (The data were not normalized.)

TABLE VI

Control Without Polymer

| Board No. | Board Wt. | Nail Pull (lbs. f) | Core P.S.I. | PF @ 70/50 | % Bond @ 70/50 | PF @ 90/90 | % Bond @ 90/90 |
|---|---|---|---|---|---|---|---|
| 1 | 1700 | 83.7 | 306 | 39.1 | 99.7 | 24.6 | 96.9 |
| 2 | 1690 | 80.3 | 334 | 37.1 | 100 | 26.1 | 98.6 |
| 3 | 1631 | 70.6 | 286 | 40.9 | 99.7 | 24.1 | 98.9 |
| 4 | 1627 | 75.7 | 282 | 41.0 | 100 | 24.9 | 99.4 |
| 5 | 1535 | 68.3 | 238 | 42.0 | 99.6 | 24.1 | 96.1 |
| 6 | 1498 | 64.3 | 230 | 42.0 | 98.9 | 24.2 | 75 |
| 7 | 1455 | 66.1 | 214 | 39.5 | 98.2 | 21.6 | 46 |
| 8 | 1398 | 59.9 | 180 | 35.9 | 83 | 22.9 | 57 |
| 9 | 1357 | 57.2 | 170 | 36.9 | 78 | 18.5 | 9 |
| 10 | 1260 | 52.9 | 134 | 30.1 | 35 | 15.3 | 0 |

TABLE VII

Polymer D @ 1 wt. %

| Board No. | Board Wt. | Nail Pull (lbs. f) | Core P.S.I. | PF @ 70/50 | % Bond @ 70/50 | PF @ 90/90 | % Bond @ 90/90 |
|---|---|---|---|---|---|---|---|
| 1 | 1596 | 88.0 | 348 | 39.5 | 100 | 26.2 | 99.6 |
| 2 | 1556 | 87.5 | 334 | 39.1 | 100 | 24.7 | 100 |
| 3 | 1525 | 79.7 | 296 | 39.3 | 100 | 25.8 | 99.6 |
| 4 | 1489 | 77.3 | 288 | 37.8 | 100 | 26.7 | 99.4 |
| 5 | 1357 | 64.3 | 226 | 42.1 | 99.9 | 20.2 | 64 |
| 6 | 1296 | 60.6 | 188 | 42.1 | 100 | 20.5 | 51 |
| 7 | 1250 | 59.1 | 173 | 39.5 | 98.5 | 19.8 | 48 |
| 8 | 1206 | 53.6 | 158 | 39.4 | 95.5 | 17.1 | 8 |

TABLE VIII

Polymer E @ 1 wt. %

| Board No. | Board Wt. | Nail Pull (lbs. f) | Core P.S.I. | PF @ 70/50 | % Bond @ 70/50 | PF @ 90/90 | % Bond @ 90/90 |
|---|---|---|---|---|---|---|---|
| 1 | 1663 | 90.3 | 424 | 36.6 | 100 | 24.8 | 99.9 |
| 2 | 1642 | 91.7 | 400 | 38.0 | 100 | 26.1 | 99.2 |
| 3 | 1616 | 88.3 | 356 | 40.0 | 100 | 25.4 | 99.5 |
| 4 | 1585 | 87.6 | 336 | 38.6 | 100 | 26.4 | 99.6 |
| 5 | 1558 | 79.7 | 319 | 38.9 | 97.7 | 24.0 | 99.4 |
| 6 | 1536 | 78.0 | 326 | 37.8 | 99.9 | 25.5 | 99.2 |
| 7 | 1509 | 74.1 | 293 | 40.4 | 100 | 26.0 | 99.6 |
| 8 | 1416 | 67.6 | 209 | 42.3 | 99.7 | 21.8 | 59 |
| 9 | 1350 | 62.0 | 194 | 42.0 | 99.7 | 17.6 | 37 |
| 10 | 1315 | 58.2 | 180 | 38.9 | 98.7 | 20.4 | 47 |
| 11 | 1308 | 60.8 | 156 | 36.8 | 84 | 20.9 | 51 |

TABLE IX

Polymer F @ 1 wt. %

| Board No. | Board Wt. | Nail Pull (lbs. f) | Core P.S.I. | PF @ 70/50 | % Bond @ 70/50 | PF @ 90/90 | % Bond @ 90/90 |
|---|---|---|---|---|---|---|---|
| 1 | 1599 | 82.2 | 360 | 38.4 | 100 | 25.7 | 99.9 |
| 2 | 1561 | 86.0 | 360 | 38.4 | 100 | 25.7 | 99.7 |
| 3 | 1508 | 78.3 | 311 | 40.4 | 100 | 25.0 | 97.4 |
| 4 | 1488 | 79.3 | 295 | 39.4 | 100 | 26.6 | 99.6 |
| 5 | 1304 | 58.9 | 216 | 41.6 | 99.9 | 25.0 | 93.4 |
| 6 | 1275 | 60.0 | 202 | 39.8 | 99.9 | 21.9 | 82 |
| 7 | 1238 | 59.4 | 164 | 40.4 | 99.9 | 21.7 | 70 |
| 8 | 1183 | 55.9 | 135 | 37.4 | 88.0 | 20.8 | 30 |

TABLE X

Polymer G @ 1 wt. %

| Board No. | Board Wt. | Nail Pull (lbs. f) | Core P.S.I. | PF @ 70/50 | % Bond @ 70/50 | PF @ 90/90 | % Bond @ 90/90 |
|---|---|---|---|---|---|---|---|
| 1 | 1582 | 85.7 | 317 | 39.5 | 100 | 26.1 | 100 |
| 2 | 1522 | 77.0 | 259 | 40.1 | 100 | 25.3 | 99.9 |
| 3 | 1483 | 78.8 | 233 | 39.3 | 100 | 26.9 | 99.6 |
| 4 | 1469 | 73.9 | 241 | 40.0 | 99.9 | 26.6 | 98 |
| 5 | 1373 | 62.8 | 166 | 38.4 | 97.6 | 20.2 | 45 |
| 6 | 1311 | 61.2 | 201 | 42.8 | 99.6 | 21.6 | 64 |
| 7 | 1295 | 61.4 | 182 | 31.6 | 66 | 20.9 | 64 |
| 8 | 1273 | 59.0 | 197 | 39.6 | 98.9 | 19.8 | 37 |

TABLE XI

Polymer H @ 1 wt. %

| Board No. | Board Wt. | Nail Pull (lbs. f) | Core P.S.I. | PF @ 70/50 | % Bond @ 70/50 | PF @ 90/90 | % Bond @ 90/90 |
|---|---|---|---|---|---|---|---|
| 1 | 1684 | 94.9 | 390 | 42.0 | 99.9 | 24.8 | 99.9 |
| 2 | 1659 | 93.1 | 372 | 41.5 | 99.9 | 25.8 | 99.9 |
| 3 | 1621 | 90.1 | 302 | 41.9 | 100 | 25.8 | 99.9 |
| 4 | 1583 | 87.0 | 314 | 40.4 | 100 | 25.8 | 99.7 |
| 5 | 1541 | 80.9 | 304 | 37.5 | 99.9 | 24.4 | 99.9 |
| 6 | 1522 | 79.4 | 291 | 39.4 | 100 | 23.4 | 98.9 |
| 7 | 1502 | 73.7 | 271 | 40.9 | 99.9 | 23.9 | 98.1 |
| 8 | 1459 | 73.9 | 232 | 38.9 | 98.7 | 25.2 | 97 |
| 9 | 1371 | 66.2 | 180 | 40.5 | 99.6 | 20.6 | 47 |
| 10 | 1332 | 62.1 | 193 | 40.8 | 98.6 | 21.9 | 67 |
| 11 | 1303 | 63.0 | 162 | 37.4 | 92.4 | 21.6 | 50 |
| 12 | 1267 | 57.3 | 144 | 35.5 | 86 | 20.2 | 26 |

TABLE XII

Polymer I @ 1 wt. %

| Board No. | Board Wt. | Nail Pull (lbs. f) | Core P.S.I. | PF @ 70/50 | % Bond @ 70/50 | PF @ 90/90 | % Bond @ 90/90 |
|---|---|---|---|---|---|---|---|
| 1 | 1545 | 73.4 | 287 | 42.1 | 100 | 23.1 | 96.9 |
| 2 | 1533 | 78.4 | 188 | 39.3 | 100 | 25.8 | 97.0 |
| 3 | 1519 | 72.5 | 203 | 39.9 | 100 | 25.1 | 99.6 |

TABLE XII-continued

Polymer I @ 1 wt. %

| Board No. | Board Wt. | Nail Pull (lbs. f) | Core P.S.I. | PF @ 70/50 | % Bond @ 70/50 | PF @ 90/90 | % Bond @ 90/90 |
|---|---|---|---|---|---|---|---|
| 4 | 1500 | 74.5 | 303 | 42.5 | 99.7 | 24.4 | 100 |
| 5 | 1461 | 72.4 | 270 | 42.5 | 99.1 | 26.3 | 98.6 |
| 6 | 1451 | 74.6 | 265 | 41.3 | 100 | 25.6 | 98.9 |
| 7 | 1429 | 70.9 | 250 | 43.5 | 99.7 | 25.9 | 99.1 |
| 8 | 1425 | 74.2 | 228 | 39.1 | 99.5 | 25.7 | 98.0 |
| 9 | 1329 | 67.6 | 203 | 40.3 | 99.6 | 22.3 | 88 |
| 10 | 1314 | 65.7 | 191 | 41.5 | 98.9 | 23.5 | 88 |
| 11 | 1295 | 66.0 | 178 | 39.3 | 97.6 | 23.4 | 82 |
| 12 | 1256 | 62.2 | 86 | 36.6 | 98.9 | 20.9 | 54 |

TABLE XIII

Polymer J @ 1 wt. %

| Board No. | Board Wt. | Nail Pull (lbs. f) | Core P.S.I. | PF @ 70/50 | % Bond @ 70/50 | PF @ 90/90 | % Bond @ 90/90 |
|---|---|---|---|---|---|---|---|
| 1 | 1540 | 87.6 | 308 | 42.6 | 100 | 25.6 | 99.7 |
| 2 | 1524 | 72.4 | 284 | 38.5 | 100 | 25.2 | 99.4 |
| 3 | 1499 | 74.8 | 266 | 44.1 | 99.9 | 25.4 | 99.4 |
| 4 | 1473 | 73.3 | 231 | 41.0 | 100 | 24.2 | 96.2 |
| 5 | 1461 | 75.7 | 252 | 42.5 | 99.6 | 25.9 | 99.2 |
| 6 | 1446 | 76.1 | 188 | 39.0 | 99.9 | 25.9 | 99.6 |
| 7 | 1419 | 69.6 | 242 | 40.8 | 99.1 | 25.5 | 98.4 |
| 8 | 1412 | 67.9 | 159 | 42.3 | 99.6 | 24.9 | 93.2 |
| 9 | 1362 | 65.8 | 176 | 40.4 | 99.7 | 23.1 | 70 |
| 10 | 1337 | 63.5 | 123 | 40.5 | 98.5 | 18.5 | 39 |
| 11 | 1261 | 59.3 | 129 | 41.9 | 98.9 | 21.5 | 48 |
| 12 | 1250 | 57.4 | 170 | 37.5 | 89 | 19.8 | 40 |

A statistical line of regression analysis was performed on the board weights and nail pull test data in order to calculate board weights required to achieve various nail pull values for certain of the polymer emulsions used at one percent based on the weight of rehydrated gypsum. These results are shown in Table XIV below. In addition, board weights required to achieve various nail pull values were calculated based upon all of the data obtained during testing. These results are shown in Table XV below.

TABLE XV

BOARD WEIGHTS REQUIRED TO ACHIEVE VARIOUS NAIL PULL VALUES
(BASED UPON ALL DATA)

| Nail Pull Value | Control | Polymer D @ 1% | Polymer E @ 1% | Polymer F @ 1% | Polymer G @ 1% | Polymer H @ 1% | Polymer I @ 1% | Polymer J @ 1% |
|---|---|---|---|---|---|---|---|---|
| 85 | 1780 | 1545 | 1575 | 1575 | 1575 | 1560 | 1745 | 1585 |
| 80 | 1700 | 1480 | 1515 | 1500 | 1505 | 1495 | 1620 | 1515 |
| 75 | 1625 | 1450 | 1480 | 1425 | 1440 | 1450 | 1490 | 1445 |
| 70 | 1545 | — | — | 1300 | — | — | 1425 | — |

TABLE XIV

BOARD WEIGHTS REQUIRED TO ACHIEVE VARIOUS NAIL PULL VALUES
(BASED UPON NAIL PULL DATA ONLY)

| Nail Pull Value | Control | Polymer D @ 1% | Polymer E @ 1% | Polymer F @ 1% | Polymer G @ 1% | Polymer H @ 1% | Polymer I @ 1% | Polymer J @ 1% |
|---|---|---|---|---|---|---|---|---|
| 85 | 1780 | 1545 | 1575 | 1575 | 1575 | 1560 | 1745 | 1585 |
| 80 | 1700 | 1480 | 1515 | 1500 | 1505 | 1495 | 1620 | 1515 |
| 75 | 1625 | 1415 | 1455 | 1425 | 1440 | 1435 | 1490 | 1445 |
| 70 | 1545 | 1350 | 1395 | 1350 | 1375 | 1370 | 1355 | 1370 |
| 65 | 1470 | 1290 | 1335 | 1275 | 1305 | 1310 | 1220 | 1300 |
| 60 | 1395 | 1225 | 1275 | 1200 | 1240 | 1245 | 1090 | 1225 |

Thus, it has been found that when the acrylic polymer emulsions of the invention are added to a settable gypsum wallboard core composition, the set core (a) has significantly increased internal strength and (b) significantly increased paper-to-core bonding, as exemplified by the above data. Consequently, the board density can be reduced while still maintaining required physical properties of the board. In some cases, the weight of the board can be reduced to as low as 1480 pounds per 1000 square feet of one-half inch thick board. Other properties of the wallboard product can also be benefitted by use of the inventive method, including transverse load strengths, sag resistance, and core tensile strengths. In addition, the inventive method may advantageously provide these strengths over substantial periods of time.

The foregoing detailed description is given for clearness of understanding only, and no unnecessary limitations should be understood therefrom, as modifications within the scope of the invention will be apparent to those skilled in the art. For example, the order in which the ingredients of the core composition are combined can be altered without negatively affecting the properties of the produced wallboard.

What is claimed is:

1. A composition suitable for use in the manufacture of gypsum construction materials, comprising:
   (a) calcium sulfate hemihydrate;
   (b) sufficient water to form a slurry comprising at least about 48 wt. % said calcium sulfate hemihydrate; and
   (c) an acrylic polymer emulsion having a glass transition temperature of about 15° C. or greater;
wherein said polymer emulsion is substantially stable to divalent ions.

2. The composition of claim 1, wherein the glass transition temperature is in a range of about 20° C. to about 60° C.

3. The composition of claim 1, wherein the glass transition temperature is in a range of about 35° C. to about 60° C.

4. The composition of claim 1, wherein the glass transition temperature is about 35° C.

5. The composition of claim 1, wherein the glass transition temperature is about 60° C.

6. The composition of claim 1, wherein said polymer emulsion is included at about 1.0 to about 2.0 weight percent, based on an amount of rehydrated calcium sulfate hemihydrate.

7. The composition of claim 1, wherein the polymer has a molecular weight in a range of about 300,000 to about 700,000.

8. A method of producing a composition suitable for use in the manufacture of gypsum construction materials, comprising the steps of:
   (a) forming a slurry comprising water, calcium sulfate hemihydrate, and an acxylic polymer emulsion, said slurry comprising at least about 48 wt. % calcium sulfate hemihydrate, and
   (b) mixing said slurry;
wherein said acrylic polymer emulsion has a glass transition temperature of about 15° C. or greater and said polymer emulsion is substantially stable to divalent ions.

9. The method of claim 8, wherein:
   the glass transition temperature is in a range of about 35° C. to about 60° C.

10. The method of claim 8, wherein:
    the glass transition temperature is about 35° C.

11. The method of claim 8, wherein:
    the glass transition temperature is about 60° C.

12. The method of claim 8, wherein the polymer has a molecular weight in a range of about 300,000 to about 700,000.

13. The method of claim 8, wherein said polymer emulsion is included at about 1.0 to about 2.0 weight percent, based on an amount of rehydrated calcium sulfate hemihydrate.

14. A gypsum wallboard panel, comprising:
    (a) a first cover sheet and a second cover sheet and
    (b) a core disposed between said cover sheets, said core comprising calcium sulfate dihydrate and an acrylic polymer emulsion, said emulsion having a glass transition temperature of about 15° C. or greater;
    wherein said core has a density of about 35.5 pounds per cubic foot or greater.

15. The wallboard panel of claim 14, wherein said panel (a) has a density of less than about 1500 pounds per thousand square feet of half-inch thick panel and (b) a nail pull value of at least about 80 pounds (force).

16. The wallboard panel of claim 14, wherein said panel has (a) a density of less than about 1500 pounds per thousand square feet of half-inch thick panel and (b) a nail pull value of at least about 80 pounds (force).

17. The wallboard panel of claim 14, wherein the glass transition temperature is in a range of about 20° C. to about 60° C.

18. The wallboard panel of claim 14, wherein the glass transition temperature is in a range of about 35° C. to about 60° C.

19. The wallboard panel of claim 14, wherein the glass transition temperature is about 35° C.

20. The wallboard panel of claim 14, wherein the glass transition temperature is about 60° C.

21. The wallboard panel of claim 14, wherein said polymer emulsion is included at about 1.0 to about 2.0 weight percent, based on an amount of rehydrated calcium sulfate hemihydrate.

22. The wallboard panel of claim 14, wherein the polymer has a molecular weight in a range of about 300,000 to about 700,000.

23. The method of claim 14, wherein the core has a density of about 40.8 pounds per cubic foot or less.

24. A method of producing gypsum wallboard, comprising the steps of:
   (a) forming a slurry comprising water, calcium sulfate hemihydrate, and an acrylic polymer emulsion, said emulsion having a glass transition temperature of about 15° C. or greater and wherein said slurry comprises at least about 48 wt. % calcium sulfate hemihydrate;
   (b) mixing said slurry; and
   (c) depositing said slurry on a cover sheet.

25. The method of claim 24 wherein:
   said glass transition temperature is in a range of about 15° C. to about 60° C.

26. The method of claim 24, wherein said polymer emulsion is substantially stable to divalent ions.

27. The method of claim 24, wherein said polymer emulsion is included at about 1.0 to about 2.0 weight percent, based on an amount of rehydrated calcium sulfate hemihydrate.

28. The wallboard produced by the method of claim 24.

29. The method of claim 24, wherein the polymer has a molecular weight in a range of about 300,000 to about 700,000.

30. A composition suitable for use in the manufacture of gypsum construction materials, comprising:
   (a) calcium sulfate hemihydrate;
   (b) sufficient water to form a slurry comprising at least about 48 wt. % said calcium sulfate hemihydrate; and
   (c) an acrylic polymer emulsion having a glass transition temperature of about 15° C. or greater;
   wherein said polymer emulsion is included at about 1.0 to about 2.0 weight percent, based on weight of rehydrated calcium sulfate hemihydrate.

31. The composition of claim 30, wherein the glass transition temperature is in a range of about 35° C. to about 60° C.

32. The composition of claim 30, wherein said polymer emulsion is substantially stable to divalent ions.

33. A method of producing a composition suitable for use in the manufacture of gypsum construction materials, comprising the steps of:
   (a) forming a slurry comprising water, calcium sulfate hemihydrate, and an acrylic polymer emulsion, said slurry comprising at least about 48 wt. % calcium sulfate hemihydrate, and
   (b) mixing said slurry;
   wherein said acrylic polymer emulsion has a glass transition temperature of about 15° C. or greater and said polymer emulsion is included at about 1.0 to about 2.0 weight percent, based on weight of rehydrated calcium sulfate hemihydrate.

34. The method of claim 33, wherein said polymer emulsion is substantially stable to divalent ions.

* * * * *

UNITED STATES PATENT AND TRADEMARK OFFICE
CERTIFICATE OF CORRECTION

PATENT NO. : 5,879,825
DATED : March 9, 1999
INVENTOR(S) : W. Roy Burke and Larry W. Kingston It is certified that error appears in the above-identified patent and that said Letters Patent is hereby corrected as shown below:

IN THE CLAIMS:

Claim 8, col. 16, line 16, delete "acxylic" and insert --acrylic-- therefor; and Claim 16, col. 16, line 51, delete "1500" and insert --1600-- therefor.

Signed and Sealed this

Thirteenth Day of July, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,879,825

DATED : March 9, 1999

INVENTOR(S) : W. Roy Burke and Larry W. Kingston

It is certified that error appears in the above-identified patent and that said Letters Patent is hereby corrected as shown below:

<u>IN THE CLAIMS</u>:

Claim 8, cols. 15-16, fifth line of claim, delete "acxylic" and insert --acrylic-- therefor;

Claim 15, col. 16, second line of claim, delete "(a) has" and insert --has (a)-- therefor;

Claim 15, col. 16, second line of claim, following about, delete "1500" and insert --1600-- therefor; and Claim 16, col. 16, second line of claim, delete "has (a)" and insert --(a) has-- therefor.

Signed and Sealed this

Seventh Day of September, 1999

Attest:

Q. TODD DICKINSON

*Attesting Officer*

*Acting Commissioner of Patents and Trademarks*